United States Patent [19]
Leupe et al.

[11] Patent Number: 5,988,053
[45] Date of Patent: Nov. 23, 1999

[54] MISTIE DETECTION SYSTEM FOR AGRICULTURAL BALERS

[75] Inventors: Dirk Georges Cornelius Leupe, Roeselare; Johan Maurice Vande Ginste, Tielt; Marnix Jozef Schoonheere, Ichtegem, all of Belgium

[73] Assignee: New Holland North America, Inc., New Holland, Pa.

[21] Appl. No.: 09/007,338

[22] Filed: Jan. 15, 1998

[30] Foreign Application Priority Data

Jan. 28, 1997 [GB] United Kingdom ................ 9701681

[51] Int. Cl.⁶ .......................... B65B 13/26; A01F 15/08
[52] U.S. Cl. ................... 100/3; 56/343; 100/4; 100/19 R; 200/61.18
[58] Field of Search ................. 100/2, 3, 4, 17, 100/18, 19 R, 189; 56/341, 343; 200/61.18

[56] References Cited

U.S. PATENT DOCUMENTS

| 4,074,623 | 2/1978 | White. | |
|---|---|---|---|
| 4,196,661 | 4/1980 | Yatcilla et al. | |
| 4,756,235 | 7/1988 | Cartner. | |
| 4,765,235 | 8/1988 | Schrag et al. | 100/4 |
| 4,885,991 | 12/1989 | Borba | 100/4 |
| 4,998,961 | 3/1991 | Anderson et al. | 100/4 |
| 5,388,504 | 2/1995 | Kluver | 100/4 |
| 5,783,816 | 7/1998 | McPherson | 100/4 |

FOREIGN PATENT DOCUMENTS

| 0400379 | 12/1990 | European Pat. Off. | 100/19 R |
|---|---|---|---|
| 0294075 | 5/1992 | European Pat. Off. . | |
| 0294078 | 12/1992 | European Pat. Off. . | |
| 208748 | 4/1984 | German Dem. Rep. . | |
| 289917 | 5/1991 | German Dem. Rep. | 100/4 |
| 3640696 | 6/1988 | Germany | 100/4 |
| 4116619 | 11/1992 | Germany | 100/4 |

Primary Examiner—Stephen F. Gerrity
Attorney, Agent, or Firm—Frank A. Seemar; Larry W. Miller; J. William Stader

[57] ABSTRACT

An agricultural baler comprising a baling chamber and a mechanism for loading successive charges of crop material into the chamber. The baler also comprises a tying mechanism for forming a plurality of loops of binding material around the packages of crop material formed in the baling chamber. The movement of the strands of binding material is monitored by sensors and compared. In case the movement of a strand deviates substantially from the movement of the other strands a mistie indication is generated. Such mistie detection system is operable to detect a wide range of mistie conditions.

25 Claims, 3 Drawing Sheets

MISTIE DETECTION SYSTEM FOR AGRICULTURAL BALERS

FIELD OF INVENTION

The present invention relates generally to an apparatus and a method for detecting mistie conditions in an agricultural baler, and more particularly to an apparatus and a method involving sensing a state of the strands of binding material which are supplied to the baling chamber.

BACKGROUND OF THE INVENTION

Conventional agricultural balers such as large rectangular balers are designed for making bales from a multitude of crops in a wide range of circumstances. The operator tends to maximize the density of the bales thereby increasing the tension in the strands of binding material which are tied around the crop material in the baling chamber. Hence the forces on the tying mechanism increase accordingly and the system becomes more prone to failure, e.g. because one of the strands slips out of a knotter, or because the strand itself breaks. The adjustment of the various components of the tying mechanism becomes very critical and misties cannot always be precluded.

In case the operator timely detects an anomaly of the system, i.e. well before the bale is ejected out of the baler, he can intervene and restore the loop around the bale manually without substantial loss of baling time. He may also prevent that components of the knotter system from becoming damaged when a knot is not properly released from the bill hook. Hence it is paramount that misties are timely indicated to the operator.

Several systems have been developed for monitoring the tying mechanism in balers. U.S. Pat. No. 4,196,661, issued Apr. 8, 1980 in the name of George Yatcilla et al, and No. 4,765,235, Aug. 23, 1988 in the name of Thomas G. Schragg et al, describe a system in which the position of the slack take-up arms of the knotters is monitored. When broken, the strand of binding material will no longer retain the arm which rises to its upper position which will be detected by the operator. However, when a completed knot fails to fall off the bill hook or when the upper strand is caught in some knotter component, the strand will remain stretched and no upward movement of the arm will be perceived. Such misties will pass undetected.

The mistie detection system according to European Patents No. EP 0,294,075 and No. EP 0,294,078, involves monitoring the closed loop after the knotter has cycled. When no closed loop is sensed a mistie signal is generated. Such system rapidly indicates a failure of a knot in a completed bale, but will not react to a breakage of a strand which still has to be tied around the next bale. Hence the operator misses the opportunity to reinstall the twine before the next knotting cycle, which would have constituted the most efficient remedy. Now he has to wrap a complete new loop around the completed bale.

Twine breakage may be detected by a mistie detection system according to DD 208,748, but herein the switch on the trip arm prevents mistie signals from being passed on to the operator before the new bale is almost completed. A failure of the knotting system will be indicated only at a very late stage.

Therefore it is an object of the present invention to overcome the problems indicated above and to provide a mistie detector system which on the one hand detects both broken and jammed strands and on the other hand provides a warning to the operator shortly after the occurrence of the failure.

SUMMARY OF THE INVENTION

According to one aspect of the present invention a mistie detector is provided for an agricultural baler, comprising a baling chamber, means for loading successive charges of crop material into the baling chamber for forming packages of the crop material therein, and means for supplying a plurality of strands of binding material to the packages of crop material for forming a plurality of loops therearound. The mistie detector comprises means for sensing a state of the strands by sensing the movement of the strands during their supply to the packages and generating output signals indicative thereof, and the mistie detector further comprises means for comparing the output signals and generating a mistie indication signal when the movement of one of the strands deviates substantially from the movement of the other strands.

According to another aspect of the present invention a method is provided for detecting a defective strand condition in an agricultural baler, comprising a baling chamber, means for loading successive charges of crop material into the baling chamber for forming packages of the crop material therein, and means for supplying a plurality of strands of binding material to the packages of crop material to form a plurality of loops therearound, the method comprising the steps of, i) sensing the movements of the strands as they are supplied to and/or around the packages, ii) generating output signals indicative of the movements, iii) comparing the movements of the strands, and iv) generating a mistie indication when the movement of a strand deviates substantially from the movement of the other strands.

The actual movement of the twines is dependent on the properties of the crop material (hay, straw, silage, . . . ) and the machine settings (e.g. density control). As the mistie detector compares the relative values of strand movement instead of absolute values, no system parameters have to be adapted when any of the conditions above is changed.

Sensors may be provided for monitoring the transverse motion of the strands, e.g. by vibration sensors. Otherwise sensors can be used for monitoring their longitudinal motion. In this case one may direct sensors to the guide wheels along which binding material is supplied to the baling chamber. Their signals enable establishment of length values for each strand. The length values may be compared to a threshold value, which can be set equal to a predetermined percentage of the mean value of all length values.

Stray signals which are not related to actual strand movement may disturb the proper operation of the mistie detector. Therefore it is advantageous to provide the detector with means for registering only those signals which are generated while a normal twine movement may be expected. Such means may include a sensor sensing the operation of a particular mechanical component, such as the loading means. When the component has stopped cycling the sensor signals are disregarded until the next cycle.

After a knotting cycle not all strands are tensioned at the same instant. Hence at this instant irregular twine movement is no indication of a mistie. It therefore may be advantageous to suspend the accumulation of sensor readings until the strands are stretched again by a few new stuffer charges. This may be realized by disregarding the signals from intervals in which more than two strands did not move.

The foregoing and other objects, features and advantages of the invention will appear more fully hereinafter from a consideration of the detailed description which follows, in conjunction with the accompanying sheets of drawings wherein the principal embodiment of the present invention is illustrated by way of example. It is to be expressly understood, however, that the drawings are for illustrative purposes and are not to be construed as defining the limits of the invention.

DESCRIPTION OF THE INVENTION

Figure 1:
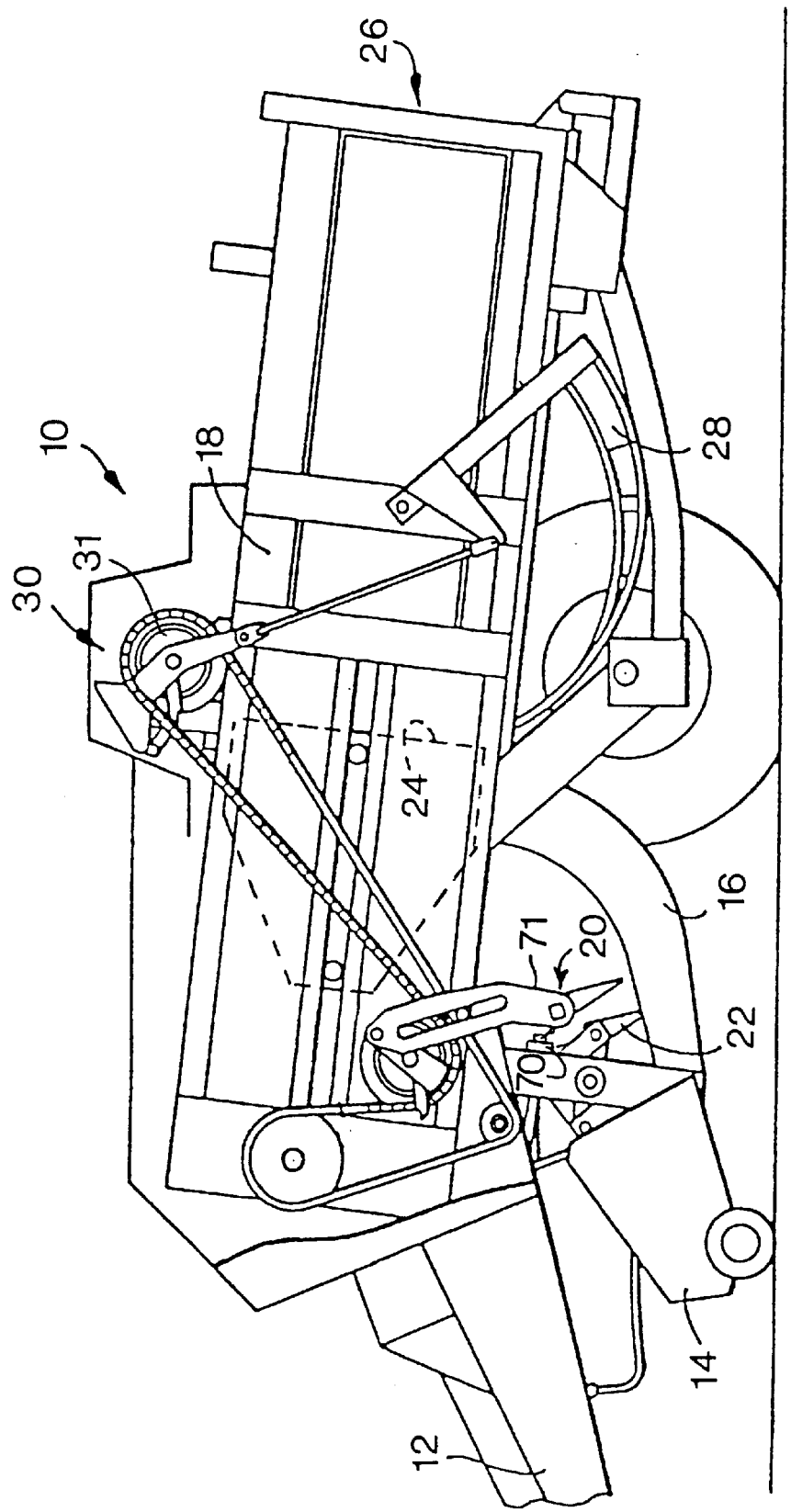
FIG. 1 is a side elevational view of an agricultural baler equipped with a mechanism for tying strands of binding material around packages of crop material formed in the baler.

FIG. 1 shows an agricultural baler 10 which is equipped with a forwardly extending tongue 12 provided with hitch means (not shown) at its front end for coupling the baler 10 to a towing tractor. A pick-up assembly 14 lifts windrowed crop material off the field as the baler 10 is travelled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means for establishing whether a complete charge has been formed therein and operating the stuffer 20 in response thereto. Each action of the stuffer 20 introduces a "charge" or "flake" of crop material from the duct 16 into the chamber 18.

A plunger 24 reciprocates in a fore-and-aft direction within the baling chamber 18 to push each new charge introduced into the baling chamber 18 rearwardly and form them into a package of crop material therein, which is pushed by the plunger 24 toward a rearmost discharge aperture 26 of the chamber.

Each package is securely bound in its final compacted form by a tying mechanism 30 before leaving the confines of the baler 10. The length of each bale produced by the baler 10 can be adjustably predetermined by conventional means not shown. The tying mechanism 30 comprises a series of periodically actuated needles 28 which are normally stationed in a stand-by condition below the chamber 18 but which, when actuated, swing upwardly through and across the baling chamber 18 to present twine to a corresponding series of knotters 31 positioned on the top of the chamber 18 and extending across the width of the latter. The number of needles 28 and corresponding knotters 31 depends on the transverse width of the baling chamber. A typical large rectangular baler may include 4 to 6 needle and knotter sets for applying 4 to 6 parallel loops of binding material around the bales. The invention will be described with reference to baler having 4 needle and knotter sets, but may also be used in balers equipped with a tying mechanism for applying more or less binding loops.

Figure 2:
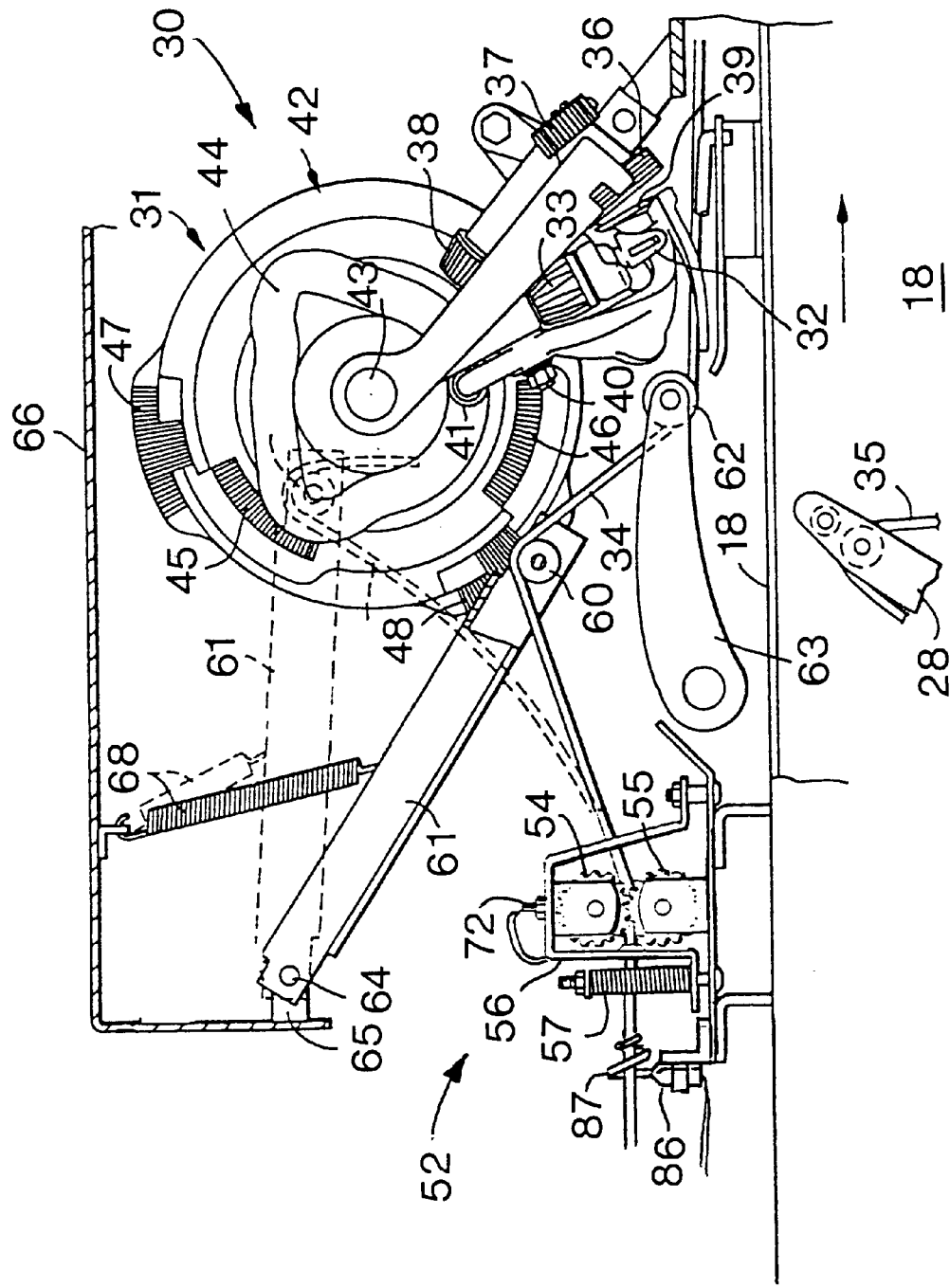
FIG. 2 is an enlarged, fragmentary view of the tying mechanism of FIG. 1, showing means for detecting the movement of the strands.

The tying mechanism shown in FIG. 2 is operable to form loops of binding twine which are each formed from two separate strands of twine 34, 35 coming from sources on top of and below the baler respectively. Each bound bale will have a stretch of twine from the upper twine source and a second generally U-shaped stretch of twine from the lower twine source lying along the opposite ends of the bale and along the bottom thereof. The two strands 34, 35 are knotted together with two separate knots at two separate locations, i.e. one at the leading end of the bale with respect to rearward discharging movement, and a second knot at the trailing end of the bale with respect to such movement. Each knotter 31 thus operates through two successive knotting sequences during each knotting cycle to prepare the second knot of a just-finished bale and a first knot of the next-to-be-formed bale. Then the four knotters 31 pause until the next package is completely formed, whereupon they are again actuated to move through two successive knot-forming sequences.

Each knotter 31 includes a bill hook 32 designated to rotate about a generally upright axis during each knotting cycle, a gear 33 coupled with the bill hook 32 for rotating the latter, a holder 36 driven by gears 37, 38 for retaining the strands 34, 35 in position during a certain portion of the knotting cycle, and a knife 39 mounted for swinging transversely of the strands about a pivot 40 so as to remove completed knots from the bill hook 32 and sever the same from the sources of strand supply at the end of each knotting operation. A cam follower 41 is located on the opposite side of the pivot 40 for effecting said swinging movement of the knife 39 in response to rotation of a driving disc 42 fixed to a transverse shaft 43 for rotation therewith.

In addition to a cam track 44 for operating the knife 39, the disc 42 also comprises a pair of circumferentially spaced apart gear sections 45, 46 which sequentially mesh with the gear 38 at spaced intervals during rotation of the disc 42 so as to operate the holder 36, and a pair of peripherally outermost, circumferentially spaced apart gear segments 47, 48 which sequentially mesh with the gear 33 of bill hook 32 at spaced intervals during rotation of the disc 42 so as to rotate the bill hook 32. Further details of the knotter 31 and its specific manner of operation may be obtained from U.S. Pat. No. 4,074,623, issued Feb. 21, 1978 in the name of Allen A. White, hereby incorporated by reference.

As depicted in FIG. 2, the knotter 31 is about to start its knotting cycle and make the final knot on a fully formed package of crop material located behind the strand 35. The upper strand 34 is shown as leading rearwardly beyond the knotter 31 toward the rear discharge aperture 26 of the baling chamber 18. Tension is maintained in the strand 34 by virtue of a tensioning device 52 which includes a pair of opposed, peripherally ribbed rollers 54 and 56. The upper roller 54 is journalled in a mount 56 which is yieldably biassed toward the lower roller 55 by a spring 57 as to clamp the strand 34 between the two rollers 54, 55. Similar tensioning devices are provided below the baling chamber 18 to maintain tension in each of the lower strands 35.

The upper strand 34 is guided over an idler roller 60 of a slack take-up arm 61 and under a roller 62 on a cam-operated tension control finger 63 before arriving in the vicinity of the bill hook 32. The slack take-up arm 61 is swingably mounted on a transverse pivot 64 supported by a lug 65 which is attached to a housing 66 overlying the knotter 31. The arm 61 is yieldably biassed upwardly by tension springs 68.

During normal bale formation the strands 34 are tensioned and hold the arms 61 in their lower position shown in solid lines in FIG. 2. However when a package of crop material has been fully formed, a knotting cycle is initiated and the tension control fingers 63 are swung upwardly. Meanwhile the arms 61 move slightly upwardly until the upper twine strands 34 are engaged by the tips of the needles 28, which further drape the upper strands 34 and the lower strands 35 across the bill hooks 32 and into awaiting notches of the holders 36. The slacker take-up arms 61 are pulled down again, while the knotter shaft 43 is rotated to grip the strands in the holders 36, to rotate the bill hooks 32 to form a series of first knots, to operate the knives 32 to severe these first knots from the strands 34, 35 still held in the holders 36, and to rotate the bill hooks 32 a second time to form a series of second knots. Finally the knives 32 are operated once more to severe these second knots from the holders 36 thereby releasing the strands 34, 35. Additional slack provided to the upper strands 34 after completion of the second knot is taken up by the arms 61 which rise to their upper position shown in phantom lines in FIG. 2.

Meanwhile new charges of crop material are being fed into the baling chamber 18 by the stuffer mechanism 20 and pushed in the direction of the aperture 26 by the plunger 24. The newly formed package stretches the twine strands 34, 35 and pulls the slack take-up arms 61 downwardly, such that, after a few stuffer strokes, they return to their lower position shown in solid lines in FIG. 2.

During normal baler operation the plunger 24 pushes the crop package in the baling chamber 18 rearwardly after each introduction of a new charge by the stuffer mechanism 20. Consequently lengths of binding material are fed to the baling chamber 18 at corresponding intervals.

The operation of the stuffer mechanism 20 is monitored by a switch 70 which is installed above the feeder duct 16 (FIG. 1) and comprises a pivotable member which is engaged by an arm 71 of the stuffer mechanism 20 when the latter is in its home position outside the duct 16. When a complete charge has been formed in the duct, the stuffer mechanism 20 is actuated and the switch 70 opens to provide a stuffer cycle signal to the mistie detector described hereafter. When the stuffer mechanism has cycled and returns to its home position, the arm 71 closes the switch 70 again.

Proximity switches 72 facing the ribbed surface of the twine tensioner rollers 54 are inserted in their mounts 54 (FIG. 2) for monitoring the movement of upper strands 34. Their signals are fed to the mistie detector also. The number of pulses generated by the proximity switches 72 is proportional to the length of binding material which has been supplied to the baling chamber 18. Alternatively proximity switches may also be installed on the tensioning devices below the baling chamber 18 for monitoring the movement of the lower strands 35.

A short stretch of binding material is pulled into the baling chamber 18 by each movement of the crop package under action of the plunger 24. During the cycling of the tying mechanism 30 substantially larger amounts of binding material are needed for forming the two knots. Thereafter the slack take-up arms 61 are in their upper positions. The first charges of the newly formed package will first tension the strands 34 and pull down the arms 61, before any fresh binding material is pulled inbetween the tensioning rollers 54, 55. Hence the proximity switches 72 sense a small amount of pulses at regular (stuffing) intervals while a crop package is being formed in the baling chamber, followed by a larger amount of pulses when knots are being formed to complete the bale, and a temporary interruption of the pulse train until the strands 34 are tensioned again by a few combined cycles of the stuffer mechanism 20 and the plunger 24. Thereafter each stuffing cycle will engender a small amount of pulses again.

In case any of the knotters 31 fails to make a proper knot, e.g. because one of the strands 34, 35 has slipped out of the holder 36, the loose end of the upper strand 34 will no longer be pulled rearwardly by the newly formed crop package, such that no more signals will be produced by the corresponding proximity switch 72. Meanwhile the signals from the other switches 72 will still indicate that the baling operation is continuing and the crop package is pushed rearwardly toward the discharge aperture 26.

When one of the twine strands breaks, the tensioning device 52 retains the loose end and the switch 72 stops generating pulse trains also.

Another knotting failure occurs when a completed knot fails to fall off the bill hook 32 and keeps hanging in the knotter 31. In this case also no more binding material will be fed to the baling chamber 18 and the corresponding proximity switch 72 will sense no movement of the upper strand 34, while the other switches 72 will start generating signals as soon as the slack take-up arms 61 have been pulled down.

Figure 3:
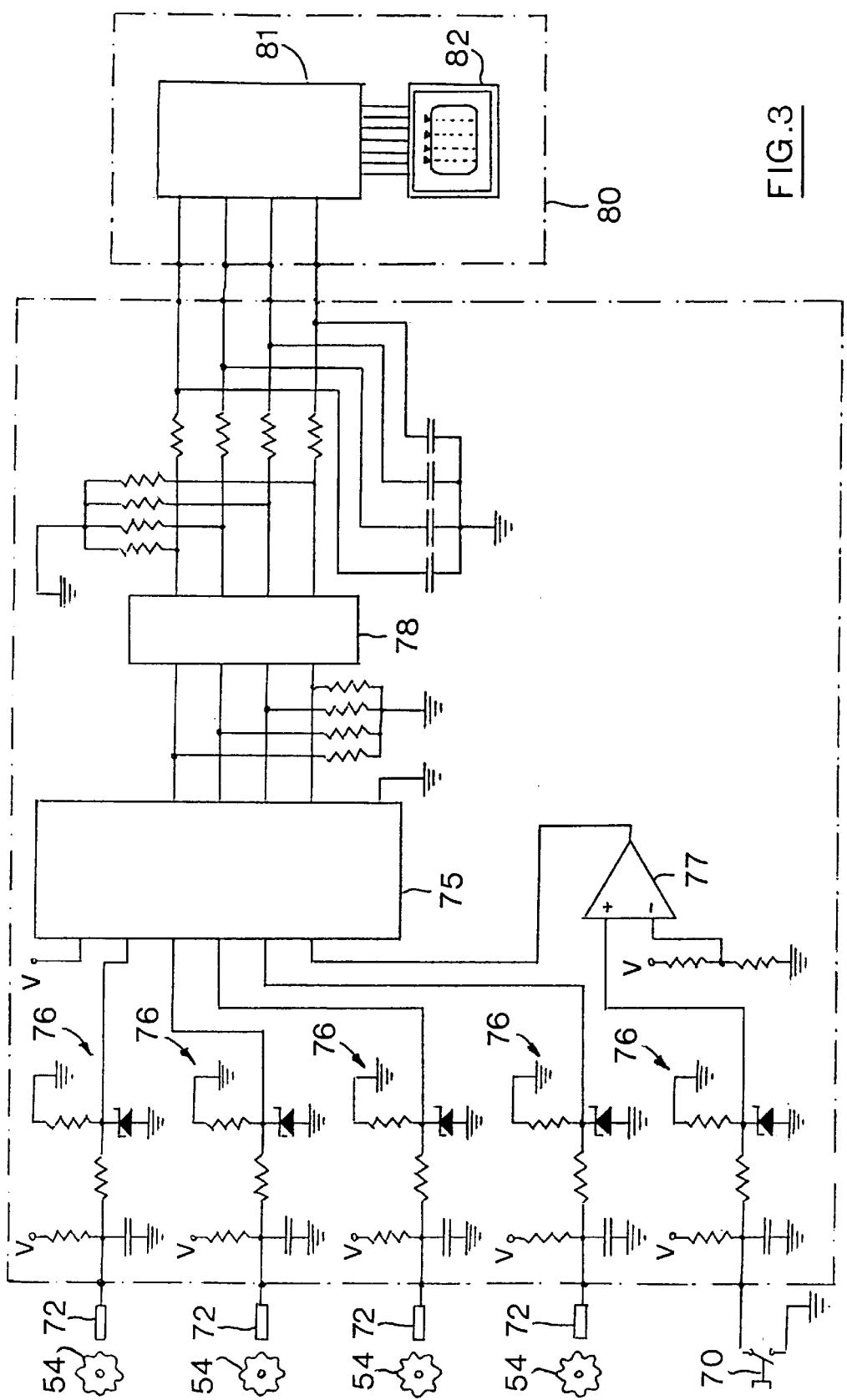
FIG. 3 is a simplified circuit diagram of a mistie detection system showing microprocessor means loaded with a program according to the Appendix for monitoring the correct operation of the tying mechanism of FIG. 2.

As described above, the signals from the proximity switches 72 and the stuffer switch 70 are used in the mistie detector, which comprises a circuit board 74 (FIG. 3) for analyzing these baler signals and providing a warning signal to the operator when a defective strand condition has been detected. The circuit board 74 includes a microprocessor 75, which may be of the Microchip type PIC16C73, which is provided with erasable memory means into which a program can be loaded in accordance with the Appendix attached hereto. The microprocessor 75 comprises a set of analogous input ports to which the proximity switches 72 are connected via diode-protected resistor circuits 76. When binding material is supplied to the baling chamber 18, the consequent rotation of the ribbed tensioning rollers 54 makes the proximity switches 72 generate a pulse train which is fed to the analogous 15 input pins.

The stuffer switch 70 is connected to a digital input port of the microprocessor 75 via a similar resistor circuit 76 and a comparator 77. While the stuffer mechanism 20 is cycling, the switch 70 is opened and a HIGH signal is provided by the comparator 77 to the digital input pin of the microprocessor.

The output gates of the microprocessor 75 are connected to an electronic buffer 78, such as an integrated circuit of the type ULN2003B, for relaying status information on the strands to a monitor 80. The latter is installed in the tractor and comprises a circuit board 81 and a liquid crystal display 82. When a defective strand condition has been detected, the corresponding output gate of the microprocessor 75 is reset by the program and this LOW status is loaded into the buffer 78. The signal is passed on to the circuit board 81, which indicates on the display 82 which knotter has failed. Such visual mistie indication may be combined with an audible signal to attract the operator's attention. This can be realized through a buzzer incorporated into the monitor 80.

The program loaded into the microprocessor 75 verifies the status of the stuffer switch signal. When the stuffer mechanism 20 is in its home position (StufferDetector LOW) the signals coming from the strand proximity switches 72 are disregarded, thereby preventing that stray signals which are not related to an actual movement of the crop package in the baling chamber 18 would influence the mistie detection. Such stray signals may occur when one of the ribs of the roller 54 happens to stop in an area wherein actuation or deactuation of the switch 72 is not precisely defined, and vibrations of the baler 10 oscillate the roller surface.

When the stuffer mechanism 20 has left its home position (StufferDetector going from LOW to HIGH) to insert a new charge or flake of crop material into the baling chamber 18, the program starts monitoring the input signals from the proximityy switches 72. Each falling flank of the signal increments a variable called RopeCounter_i, wherein i identifies the respective knotter unit 31. Hence after e.g. five complete pulses from switch i, RopeCounter_i will be loaded with the value 5.

By the time the stuffer mechanism 20 has completed the stuffing cycle and returns to its home position, the newly introduced charge has been engaged by the plunger 24 and the package in the baling chamber 18 has been pushed rearwardly. The movement of the strands 34, 35 should be terminated by then. The program checks how many of the four strands 34 actually moved during the stuffer cycle. A variable called Zero is loaded with the number of strands for which no motion has been perceived. In case a number of strands did not move (Zero smaller than a predetermined value), the measurement results are disregarded and all variables RopeCounter_i are cleared. Advantageously the predetermined value may be set equal to 3, such that intervals during which more than two strands 34 did not move are disregarded.

This program step prevents that random signals distort the results of the mistie detection. When the tying mechanism 30 has cycled, it takes a few stuffer operations to lower the slack take-up arms 61 and start supplying fresh binding material through the tensioning devices 52. Not all strands 34 are tensioned and start moving at the same instant. By disregarding the signals until a predetermined number of strands 34 has moved, which indicates that sufficient crop material has been introduced to tension most of the strands, the mistie detection skips the time interval during which no uniform supply of twine material may be expected.

When the Zero value is smaller than three, a variable named StufferCounter is incremented and the values of RopeCounter_i are added to variables RopeSum_i, into which the pulse counts are accumulated. Thereafter the RopeCounter_i and Zero values are cleared.

At the next step the program checks whether the variable StufferCounter has reached a predetermined value StufferSpan. For the sake of the description this value has been set to three, but smaller or larger values are also envisageable. After three stuffer cycles which embraced movement of the required number of binding strands, the program calculates the mean value of the four RopeSum_i values and sets a flag MeanRopeCountFlag.

The program then compares each single value RopeSum_i, indicative of the supplied length of each strand 34, to a threshold value, which is set equal to a percentage of the calculated mean value. The percentage is defined through a predetermined margin value RopeCountMargin, which here has been set equal to 60%. Hence the threshold value is equal to 40% of the mean value.

In case a RopeSum_i value is below the threshold value, a corresponding flag MistieFlag_i is set. Otherwise the MistieFlag_i is reset. In both cases the variable RopeSum_i is reset to zero for starting a new accumulation of pulse counts during the next stuffer operations.

Finally the MistieFlags are checked for producing a high or low value at the four output pins of the microprocessor 75. These values are stored in the buffer 78 and read by the circuit board 81 of the monitor 80. Any mistie indication is relayed to the display 82 in order to alert the operator.

At the start of the next stuffing cycle the StufferCounter, which was still equal to StufferSpan, is reset to zero and the MeanRopeCountFlag is reset.

According to a variation of the present invention the tying mechanism 30 may be equipped with a set of vibration sensors 86 which are installed in front of the tensioning devices 52. Sensor 86 has a spiralled sensing member 87 through which the strand 34 is guided. The transverse vibrations of a strand 34 which is being supplied to the baling chamber 18 are transmitted upon the member 87 to which a piezo-electric element has been affixed. The signals from this element are thus indicative of the movement of the corresponding strand 34.

The signals from the vibration sensors 86 are compared by a microprocessor, which will generate a mistie indication if during a time interval no movement of one of the strands has been sensed, while proper movement is sensed of a predetermined minimum number of strands 34. The time interval during which the twine supply is tested, may also be delimited by the cycling of the stuffer mechanism 20. The microprocessor then monitors the output of the sensors 86 while the mechanism has left its home position. The signals are accumulated during a predetermined number of stuffer cycles and then compared to each other to trace any substantially deviating values. In case such anomalies are found a mistie indication is generated by the microprocessor.

Although the invention has been described with reference to a large rectangular baler, other embodiments can be thought of, without departing however from the original idea of the invention.

For instance it may also be used in other types of balers in which a plurality of strands is supplied to the baling chamber.

The microprocessor 75 may also register the length of the time intervals during which signals are generated and then compare the summed time values to establish a failure of any the strands 34. In such case it is not necessary to count the pulses from the proximity switches 70 or the vibrations sensors 86. The microprocessor 75 only has to establish the length of each pulse train.

The operation of the stuffer mechanism 20 can also be detected by a sensor which is actuated by another portion of the stuffer mechanism, e.g. by the means for establishing whether a complete charge has been formed in the duct 16 and coupling the stuffer mechanism 20 to the drive mechanism.

It is also conceivable to derive motion of the crop package in the baling chamber 26 from other components of the baler such as the plunger 24. Introduction of a new charge in the baling chamber will effect an increase in the plunger load, which may be sensed by load sensors installed between the plunger 24 and its drive cranks. The motion of the strands 34 may then only be monitored during this increase in plunger load.

The invention may also be used in mechanisms for tying other kinds of binding material around the crop packages. For instance one may use wires instead of twine material and wire twisters instead of twine knotters.

The proximity switches 72 may also be replaced with other sensors for sensing the rotation of a twine guide wheel. Such sensors may include Hall sensors or optical sensors in combination with a light source.

While preferred structure in which the principles of the present invention are shown and described in the description set forth above, it is to be understood that the invention is not limited to such preferred structure, but that, in fact, widely different means of varying scope and configuration may be employed in the practice of the invention.

APPENDIX

```
IF(PowerOnResetFlag == FALSE)
{
   KnotterOK_1 = ON;        KnotterOK_2 = ON;
   KnotterOK_3 = ON;        KnotterOK_4 = ON;
   MistieFlag_1 = FALSE;    MistieFlag_2 = FALSE;
   MistieFlag_3 = FALSE;    MistieFlag_4 = FALSE;
   RopeCounter_1 = 0;       RopeCounter_2 = 0;
   RopeCounter_3 = 0;       RopeCounter_4 = 0;
   Zero = 0;
   RopeSum_1 = 0;           RopeSum_2 = 0;
   RopeSum_3 = 0;           RopeSum_4 = 0;
   StufferCounter = 0;
   StufferSpan = 3
   RopeCountMargin = 60;
   LastTwine = 4
   PowerOnResetFlag = TRUE; /* All Initializations Completed */
}
/*************************************************/
IF(  (Status StufferDetector goes from LOW to HIGH)
   && (StufferCounter == StufferSpan))
   {StufferCounter = 0;
   MeanRopeCountFlag = FALSE};
/*************************************************/
WHILE(StufferDetector == HIGH)
   IF(Status RopeDetector_1 goes from HIGH to LOW)
      RopeCounter_1 += 1;
/*************************************************/
WHILE(StufferDetector == HIGH)
   IF(Status RopeDetector_2 goes from HIGH to LOW)
      RopeCounter_2 += 1;
/*************************************************/
WHILE(StufferDetector == HIGH)
   IF(Status RopeDetector_3 goes from HIGH to LOW)
      RopeCounter_3 += 1;
/*************************************************/
WHILE(StufferDetector == HIGH)
   IF(Status RopeDetector_4 goes from HIGH to LOW)
      RopeCounter_4 += 1;
/*************************************************/
IF(Status StufferDetector goes from HIGH to LOW))
   {
   For i= 1 to LastTwine do
      IF (RopeCounter_1=0)
         Zero = Zero +1;
   IF Zero < 3
      {StufferCounter += 1;
      For i= 1 to LastTwine
         RopeSum_i=RopeSum_i + Rope_counter_i;
      }
   For i = 1 to LastTwine do
      RopeCounter_i=0;
   Zero = 0;
   }
/*************************************************/
IF(StufferCounter == StufferSpan)
{
```

$$\mathrm{MeanRopeCount} = \frac{\sum_{i=0}^{i=4} \mathrm{RopeSum}_i}{4};$$

```
   MeanRopeCountFlag = TRUE;
}
/*************************************************/
IF((StufferCounter == StufferSpan)&&(MeanRopeCountFlag == TRUE))
{
   IF(RopeSum_1 < MeanRopeCount * (1 - (RopeCountMargin/100)))
      MistieFlag_1 = TRUE;
   ELSE
      MistieFlag_1 = FALSE;
   RopeSum_1 = 0;
```

APPENDIX-continued

```
   IF(RopeSum_2 <MeanRopeCount * (1 - (RopeCountMargin/100)))
      MistieFlag_2 = TRUE;
   ELSE
      MistieFlag2 = FALSE;
   RopeSum_2 = 0;
   IF(RopeSum_3 < MeanRopeCount * (1 - (RopeCountMargin/100)))
      MistieFlag_3 = TRUE;
   ELSE
      MistieFlag_3 = FALSE;
   RopeSum_3 = 0;
   IF(RopeSum_4 < MeanRopeCount * (1 - (RopeCountMargin/100)))
      MistieFlag_4 = TRUE;
   ELSE
      MistieFlag_4 = FALSE;
   RopeSum_4 = 0;
/*************************************************/
IF(StufferCounter == StufferSpan)
{
   IF(MistieFlag_1 == FALSE)
      KnotterOK_1 = ON;
   ELSE
      KnotterOK_1 = OFF;
   IF(MistieFlag_2 == FALSE)
      KnotterOK_2 = ON;
   ELSE
      KnotterOK_2 = OFF;
   IF(MistieFlag_3 == FALSE)
      KnotterOK_3 = ON;
   ELSE
      KnotterOK_3 = OFF;
   IF(MistieFlag_4 == FALSE)
      KnotterOK_4 = ON;
   ELSE
      KnotterOK_4 = OFF;
}
```

Having thus described the invention, what is claimed is:

1. A mistie detector for an agricultural baler, comprising a baling chamber, means for loading successive charges of crop material into said baling chamber for forming packages of said crop material therein, and means for supplying a plurality of strands of binding material to said packages of crop material for forming a plurality of loops therearound, said mistie detector comprising sensing means for sensing the movement of said strands during their supply to said packages and for generating output signals indicative thereof, and means comparing said output signals and generating a mistie indication signal when the movement of one of said strands deviates substantially from the movement of the other strands, said sensing means comprise vibration sensors sensing the transverse motion of said strands induced by the longitudinal displacement of said strands during their supply to said packages.

2. A mistie detector according to claim 1, wherein said vibration sensors comprise a member engaged by one of said strands and a piezo-electric element which is operatively linked to said member.

3. A method for detecting a defective strand condition in an agricultural baler, comprising the steps of providing a baling chamber, loading successive charges of crop material into said baling chamber for forming packages of said crop material therein, supplying a plurality of strands of binding material to said packages of crop material to form a plurality of loops therearound, tying said strands of material to maintain said loops therearound, sensing the movements of said strands as they are supplied to and/or around said packages, generating output signals indicative of said movements, comparing the movements of said strands, and generating a mistie signal when the movement of a strand deviates substantially from the movement of the other strands, said signal indicating that at least one strand has not been tied properly.

4. A method according to claim 3, wherein said sensing step comprises sensing the transverse vibrations induced by the longitudinal movements of said strands.

5. A method according to claim 4, wherein said sensing step comprises guiding the strands along members of a vibration sensor.

6. A method according to claim 5, including the further step of deriving from said output signals values indicative of the lengths of the strands supplied during one time interval or a plurality of time intervals, and wherein said comparing step comprises comparing said length values to a threshold value, and said generating step comprises generating a mistie indication when one of said established length values is below said threshold value.

7. A method according to claim 6, including the further steps of sensing the operation of a component of said baler, and setting said time interval to the interval of a predetermined number of operations of a mechanical component of said baler.

8. A method according to claim 7, including the further steps of establishing during each interval how many strands actually move, and disregarding the interval and the strand movements therein for establishing said lengths values in case more than a predetermined number of strands did not move.

9. A method according to claim 8, wherein said predetermined number of strands is equal to two.

10. A method according to claim 7, wherein said mechanical component is a component used in said step of loading.

11. A method according to claim 6, wherein said threshold value is a predetermined percentage of the mean value of all established lengths.

12. A method according to claim 3, wherein said sensing step comprises sensing the longitudinal movement of said strands.

13. A mistie detector for an agricultural baler, comprising a baling chamber, means for loading successive charges of crop material into said baling chamber for forming packages of said crop material therein, and means for supplying a plurality of strands of binding material to said packages of crop material for forming a plurality of loops therearound, said mistie detector comprising sensing means for sensing the movement of said strands during their supply to said packages and for generating output signals indicative thereof, and means comparing said output signals and generating a mistie indication signal when the movement of one of said strands deviates substantially from the movement of the other strands, said sensing means comprise means for sensing the longitudinal displacement of the strands supplied to and/or around said packages, said means for sensing the longitudinal movement comprise sensors monitoring the movement of guide wheels along which said strands are supplied to and/or around said packages of crop material, said guide wheels comprise a ribbed strand-engaging surface and said monitoring sensors comprise proximity switches facing said ribbed surface for sensing the proximity of a rib of said surface facing said switches.

14. A mistie detector for an agricultural baler, comprising a baling chamber, means for loading successive charges of crop material into said baling chamber for forming packages of said crop material therein, and means for supplying a plurality of strands of binding material to said packages of crop material for forming a plurality of loops therearound, said mistie detector comprising sensing means for sensing the movement of said strands during their supply to said packages and for generating output signals indicative thereof, means comparing said output signals and generating a mistie indication signal when the movement of one of said strands deviates substantially from the movement of the other strands, said sensing means comprise means for sensing the longitudinal displacement of the strands supplied to and/or around said packages, means for establishing length values indicative of the length of each strand supplied during one time interval or a plurality of time intervals, and means sensing the operation of a mechanical component of said baler and providing a signal indicative thereof to said means for establishing the length values, said time interval being delimited by a predetermined number of operations of said mechanical component.

15. A mistie detector according to claim 14, wherein said means for establishing the lengths values only take account of the lengths of the strands supplied in the interval or intervals during which said mechanical component is operating.

16. A mistie detector according to claim 14, wherein said mechanical component is a part of said loading means.

17. A mistie detector for an agricultural baler, comprising a baling chamber, means for loading successive charges of crop material into said baling chamber for forming packages of said crop material therein, and means for supplying a plurality of strands of binding material to said packages of crop material for forming a plurality of loops therearound, said mistie detector comprising sensing means for sensing the movement of said strands during their supply to said packages and for generating output signals indicative thereof, means comparing said output signals and generating a mistie indication signal when the movement of one of said strands deviates substantially from the movement of the other strands, said sensing means comprise means for sensing the longitudinal displacement of the strands supplied to and/or around said packages, and means for establishing length values indicative of the length of each strand supplied during one time interval or a plurality of time intervals, said means for establishing the length values disregard the lengths of the strands supplied in the intervals during which the sensing means sensed no motion of more than a predetermined number of strands.

18. A mistie detector according to claim 17, wherein said predetermined number of strands is equal to two.

19. A mistie detector for an agricultural baler, comprising a baling chamber, means for loading successive charges of crop material into said baling chamber for forming packages of said crop material therein, and means for supplying a plurality of strands of binding material to said packages of crop material for forming a plurality of loops therearound, said mistie detector comprising sensing means for sensing the movement of said strands during their supply to said packages and for generating output signals indicative thereof, means comparing said output signals and generating a mistie indication signal when the movement of one of said strands deviates substantially from the movement of the other strands, said sensing means comprise means for sensing the longitudinal displacement of the strands supplied to and/or around said packages, and means for establishing length values indicative of the length of each strand supplied during one time interval or a plurality of time intervals, said means for comparing compare the established length values for each strand to a threshold value and generate a mistie indication when a length value is below said threshold value.

20. A mistie detector according to claim 19, wherein said threshold value is a predetermined percentage of the mean value of the established length values of all strands.

21. An improved mistie detector for an agricultural baler having a baling chamber, means for loading successive charges of crop material into said baling chamber for forming packages of said crop material therein, and means for supplying a plurality of strands of binding material to said packages of crop material for forming a plurality of loops therearound, a like plurality of knotter means for tying said plurality of strands of material to maintain said loops therearound, the improvement comprising a mistie detector comprising sensing means for sensing the movement of said strands during their supply to said packages, means for generating output signals indicative of movement of said strands, and means comparing said output signals for generating a signal when the movement of one of said strands deviates substantially from the movement of the other strands, said signal indicating that at least one of said plurality of knotter means has not tied a strand.

22. An improved mistie detector according to claim 21, wherein said sensing means comprise means for sensing the longitudinal displacement of the strands supplied to and/or around said packages.

23. An improved mistie detector according to claim 22, wherein said sensing means comprise sensors monitoring the movement of guide wheels along which said strands are supplied to and/or around said packages of crop material.

24. An improved mistie detector according to claim 23, wherein said guide wheels apply a pre-tension to said strands.

25. An improved mistie detector according to claim 22, further comprising means for establishing length values indicative of the length of each strand supplied during one time interval or a plurality of time intervals.

* * * * *